(12) United States Patent
Nakajima et al.

(10) Patent No.: US 7,973,517 B2
(45) Date of Patent: Jul. 5, 2011

(54) CONTROL DEVICE FOR VEHICLE POWER CONVERTER

(75) Inventors: Kenji Nakajima, Chiyoda-ku (JP); Masato Mori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/760,082

(22) Filed: Apr. 14, 2010

(65) Prior Publication Data

US 2011/0074364 A1    Mar. 31, 2011

(30) Foreign Application Priority Data

Sep. 30, 2009   (JP) .................................. 2009-227462

(51) Int. Cl.
*H02H 7/06* (2006.01)
(52) U.S. Cl. ................ 322/24; 322/27; 322/28; 322/34; 322/35; 322/40
(58) Field of Classification Search ............. 322/24, 322/27, 28, 34, 35, 39, 40
See application file for complete search history.

(56) References Cited

U.S. PATENT DOCUMENTS

| | | | | |
|---|---|---|---|---|
| 7,847,427 B2* | 12/2010 | Ichinose et al. | ................. | 290/44 |
| 7,902,798 B2* | 3/2011 | Kimura et al. | ................. | 322/24 |
| 2003/0178973 A1* | 9/2003 | Maehara | ........................ | 322/27 |

FOREIGN PATENT DOCUMENTS

JP    3396955 B2    12/1995

\* cited by examiner

*Primary Examiner* — T C Patel
*Assistant Examiner* — Iraj A Mohandesi
(74) *Attorney, Agent, or Firm* — Sughrue Mion, PLLC (57) ABSTRACT

The control device detects the B-terminal voltage by a B-terminal voltage detection section. When an abnormal voltage detection section detects that a voltage value of the detected B-terminal voltage is equal to or higher than a predetermined voltage value, all switching elements of the negative pole-side arm in a power conversion section are brought into conduction by a negative pole-side arm short-circuiting section, whereas all switching elements of a positive pole-side arm are interrupted. In addition, a field current is limited to zero or to a limit value by a field current control section.

3 Claims, 10 Drawing Sheets

CONTROL DEVICE FOR VEHICLE POWER CONVERTER

BACKGROUND OF THE INVENTION

1. Field of the Invention

The present invention relates to a control device for a vehicle power converter, in particular, a control device for a vehicle power converter, which is connected between an AC generator-motor and a DC power source.

2. Description of the Related Art

An on-vehicle generator-motor, which is provided in an automobile, is driven to start an engine. Further, after the engine is driven, the on-vehicle generator-motor generates power. A control device for a vehicle power converter, which performs conversion between DC power and AC power, is used for the on-vehicle generator-motor.

There is a conventional vehicle power converter described in, for example, Japanese Patent No. 3396955 (hereinafter, referred to as Patent Document 1).

In general, the control device for the vehicle power converter is connected between a generator-motor and a battery. The control device for the vehicle power converter includes a plurality of switching elements and diode elements connected in parallel to the switching elements (for example, parasitic diodes associated with the switching elements). When the generator-motor operates as a motor, the control device controls ON/OFF of the switching elements to convert DC power supplied from the battery into AC power. On the other hand, when the generator-motor operates as a generator, the AC power generated by the generator-motor is rectified by the diodes or the switching elements into the DC power.

If there is a sudden load rejection due to, for example, the disconnection of a cable for connecting a positive pole of the battery and the generator-motor, which occurs during a power-generating operation for some reason, a high voltage (overvoltage) is generated at a B-terminal. At this time, the overvoltage (corresponding to a G-pulse referred in Patent Document 1) generated at the B-terminal is suppressed by bringing all the switching elements of a negative pole-side arm into conduction in a control circuit including the switching elements to short-circuit an armature winding of the generator-motor.

Patent Document 1 describes in detail means of realizing the short-circuit of the negative pole-side arm at the time of generation of the overvoltage, and the cancellation of short-circuit of the negative pole-side arm. In Patent Document 1, when the overvoltage is generated, the switching elements of the negative pole-side arm are brought into conduction to short-circuit the armature winding of the generator-motor. A condition of the cancellation of the short-circuit is described in Patent Document 1 as follows. During a predetermined period of time after the detection of the overvoltage by an abnormal voltage detector circuit section, the short-circuit of the negative pole-side arm is maintained. After the lapse of the predetermined period of time, the short-circuit is cancelled. In the technology described in Patent Document 1, after the detection of the overvoltage at the B-terminal, the switching elements of the negative pole-side arm are brought into conduction to short-circuit the armature winding of the generator-motor for the predetermined period of time. If the B-terminal is still continuously disconnected, however, the short-circuit of the negative pole-side arm is undesirably cancelled after the lapse of the predetermined period of time because a current flowing through a field winding is not limited. As a result, the power-generating operation is restarted to disadvantageously generate the overvoltage at the B-terminal again, thereby preventing electric power from being stably supplied.

SUMMARY OF THE INVENTION

The present invention has been made to solve the problem described above, and has an object of providing a control device for a vehicle power converter, which is capable of stably supplying electric power even in a case where a negative pole-side arm is short-circuited after generation of an overvoltage and the short-circuit is then cancelled to perform a power-generating operation again.

According to the present invention, there is provided a control device for a vehicle power converter, which is connected to a polyphase AC generator-motor including an armature winding and a field winding for use for controlling switching of the switching elements of the bridge rectifier circuit and the field switching element of the field circuit, the vehicle power converter including: a bridge rectifier circuit including switching elements of a positive pole-side arm and switching elements of a negative pole-side arm, for controlling energization of the armature winding; and a field circuit for controlling energization of the field winding by using a field switching element, the control device including: B-terminal voltage detection means for detecting a B-terminal voltage generated between a B-terminal corresponding to a power input/output terminal of the polyphase AC generator-motor and a reference potential; field current detection means for detecting a field current flowing through the field winding; field current control means for controlling the field current based on a detected value of the field current; abnormal voltage detection means for detecting whether or not a voltage value of the B-terminal voltage is equal to or higher than a predetermined voltage value; and negative pole-side arm short-circuiting means for bringing all the switching elements of the negative pole-side arm into conduction when the abnormal voltage detection means detects that the voltage value of the B-terminal voltage is equal to or higher than the predetermined voltage value, in which, when the abnormal voltage detection means detects that the voltage value of the B-terminal voltage is equal to or higher than the predetermined voltage value, the control device causes the negative pole-side arm short-circuiting means to bring all the switching elements of the negative pole-side arm into conduction and to interrupt all the switching elements of the positive pole-side arm, and causes the field current control means to limit the field current.

As described above, the present invention provides the control device for a vehicle power converter, which is connected to the polyphase AC generator-motor including the armature winding and the field winding for use for controlling the switching of the switching elements of the bridge rectifier circuit and the field switching element of the field circuit, the vehicle power converter including: the bridge rectifier circuit including the switching elements of the positive pole-side arm and the switching elements of the negative pole-side arm, for controlling the energization of the armature winding; and the field circuit for controlling the energization of the field winding by using the field switching element, the control device including: the B-terminal voltage detection means for detecting the B-terminal voltage generated between the B-terminal corresponding to the power input/output terminal of the polyphase AC generator-motor and the reference potential; the field current detection means for detecting the field current flowing through the field winding; the field current control means for controlling the field current based on a detected value of the field current; the abnormal voltage detection means for detecting whether or not the voltage value of the B-terminal voltage is equal to or higher than the predetermined voltage value; and the negative pole-side arm short-circuiting means for bringing all the switching elements of the negative pole-side arm into conduction when the abnormal voltage detection means detects that the voltage value of the B-terminal voltage is equal to or higher than the predetermined voltage value, in which, when the abnormal voltage detection means detects that the voltage value of the B-terminal voltage is equal to or higher than the predetermined voltage value, the control device causes the negative pole-side arm short-circuiting means to bring all the switching elements of the negative pole-side arm into conduction and to interrupt all the switching elements of the positive pole-side arm, and causes the field current control means to limit the field current. Accordingly, at the time of generation of the overvoltage due to a load rejection, the negative pole-side arm is short-circuited while the field current is controlled. As a result, the overvoltage at the B-terminal may be suppressed. Therefore, even when the short-circuit of the negative pole-side arm is cancelled after the generation of the overvoltage to start a power-generating operation again, electric power may be stably supplied.

DETAILED DESCRIPTION OF THE PREFERRED EMBODIMENTS

First Embodiment

Figure 1:
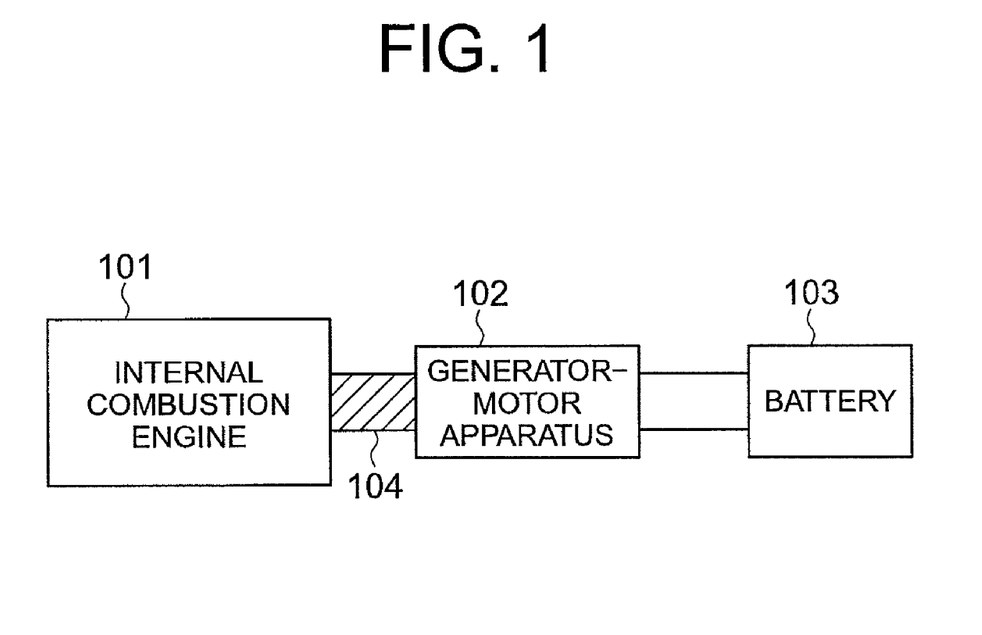
FIG. 1 is an overall configuration diagram of a vehicle system using a control device for a vehicle power converter according to the present invention.

Hereinafter, a control device for a vehicle power converter according to a first embodiment of the present invention is described in detail. FIG. 1 is an explanatory view of a vehicle system using a generator-motor as a rotating electric machine, FIG. 2 is a configuration diagram illustrating a configuration of a generator-motor apparatus including the control device for the vehicle power converter according to the first embodiment of the present invention, and FIG. 3 is a block diagram illustrating a configuration of the control device for the vehicle power converter according to the first embodiment of the present invention.

In FIG. 1, an internal combustion engine 101 is connected to a generator-motor apparatus 102 through an intermediation of, for example, power transmission means 104 such as a belt. In operation, the internal combustion engine 101 charges a battery 103 with electric energy after AC to DC conversion performed by the generator-motor apparatus 102.

Figure 2:
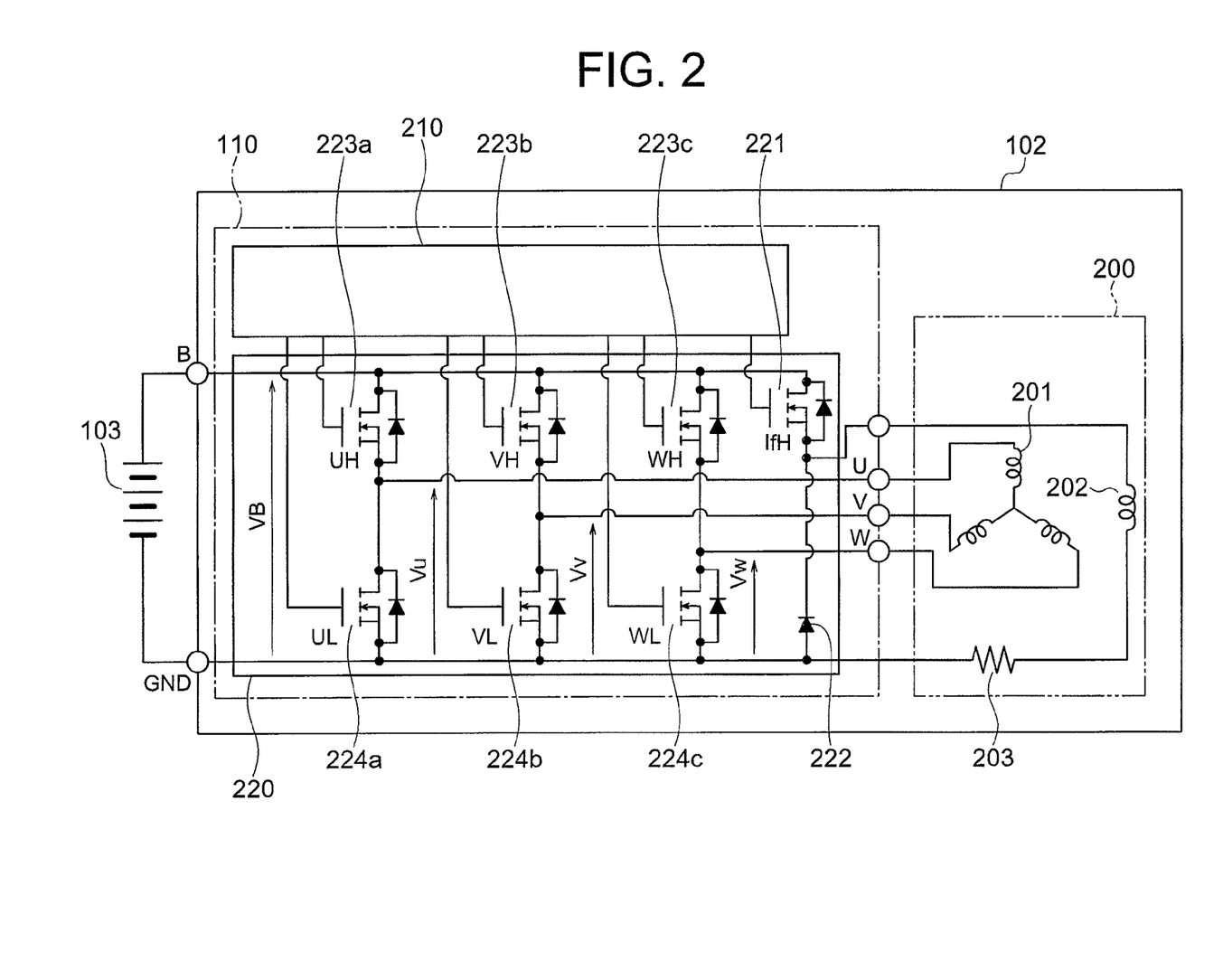
FIG. 2 is a configuration diagram of a generator-motor apparatus including the control device for the vehicle power converter according to a first embodiment of the present invention.
Figure 3:
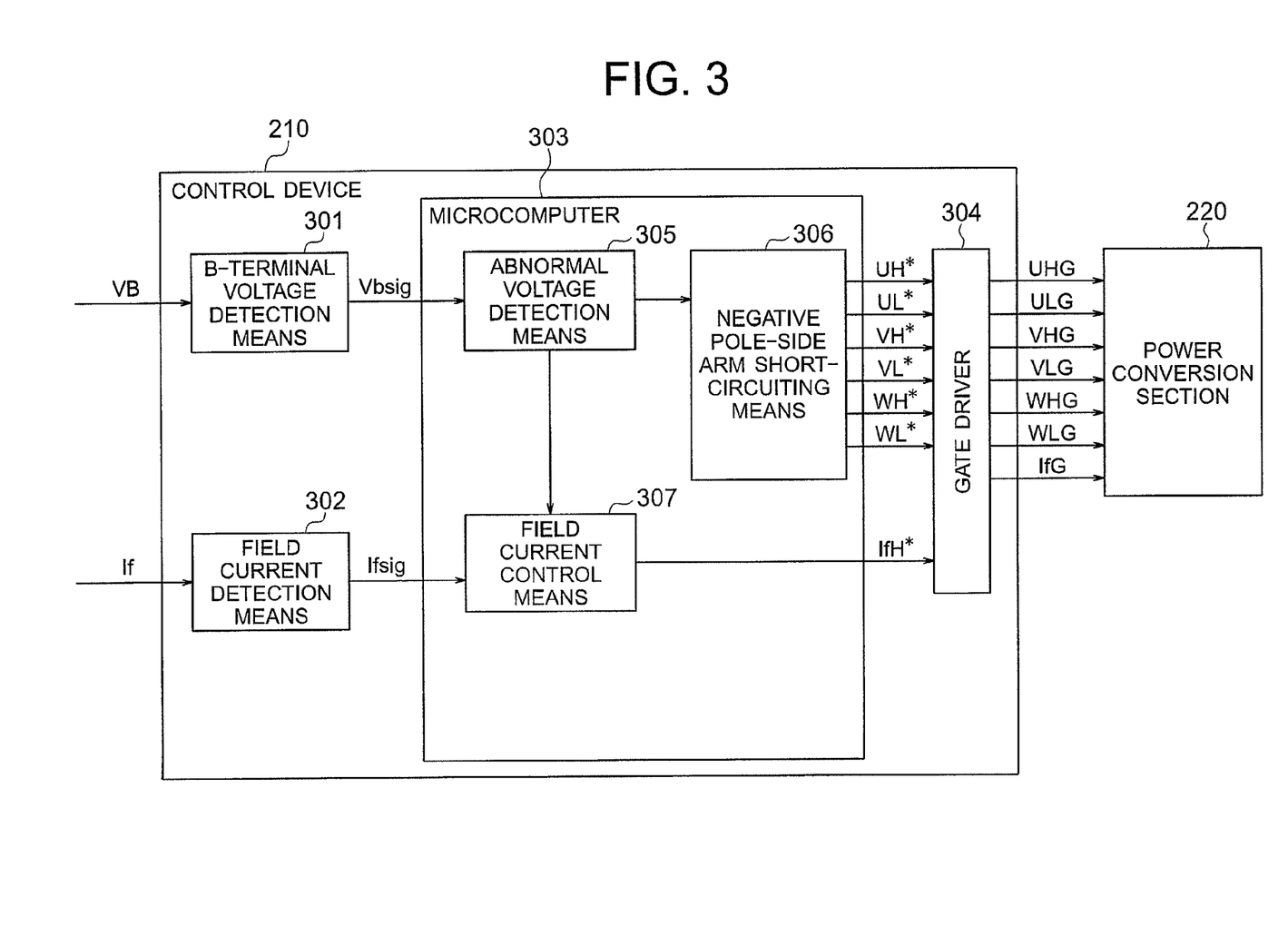
FIG. 3 is a view illustrating a configuration of the control device for the vehicle power converter according to the first embodiment of the present invention.

In FIG. 2, the generator-motor apparatus 102 includes a power conversion device 110 and a motor-generator section 200. The power conversion device 110 includes a power conversion section 220 (vehicle power converter) and a control device 210 for controlling ON/OFF of switching elements. The motor-generator section 200 includes a three-phase winding 201 having U-phase, V-phase, and V-phase terminals, a field winding 202, and a current sensor 203. The current sensor 203 detects a current flowing through the field winding 202.

The power conversion section 220 includes a field switching element 221, a free wheel diode 222, three-phase upper-arm switching elements 223a, 223b, and 223c, and three-phase lower-arm switching elements 224a, 224b, and 224c. The field switching element 221 constitutes a field circuit and controls the flow of the field current through the field winding 202 by PWM control. The free wheel diode 222 is connected in series to the field switching element 221. The three-phase upper-arm switching elements 223a to 223c and the three-phase lower-arm switching elements 224a to 224c each include a parasitic diode and constitute a bridge rectifier circuit for controlling energization of an armature winding. A B-terminal for a positive power input from the battery 103 is connected to each of the three-phase upper-arm switching elements 223a to 223c. In addition, the U-phase, V-phase, and W-phase terminals of the three-phase winding 201 of the motor-generator section 200 are respectively connected to the three-phase upper-arm switching elements 223a to 223c. A GND terminal for an earth input from the battery 103 is connected to the three-phase lower-arm switching elements 224a to 224c. In addition, the U-phase, V-phase, and W-phase terminals of the three-phase winding 201 are respectively connected to the three-phase lower-arm switching elements 224a to 224c.

In FIG. 2, the motor-generator section 200 is illustrated as a three-phase field winding type generator-motor including the three-phase winding 201 and the field winding 202. However, the number of phases of the motor-generator section 200 may be other than three. Further, the generator-motor apparatus 102 is constituted as an integrated type generator-motor apparatus including the power conversion device 110 and the motor-generator section 200 which are provided in an integrated manner. Alternatively, the generator-motor apparatus 102 may also be a separate type generator-motor apparatus including the power conversion device 110 and the motor-generator section 200 which are provided to be physically separated from each other.

Next, the description is given referring to FIG. 3 illustrating an internal configuration of the control device 210. The control device 210 includes B-terminal voltage detection means 301, field current detection means 302, a microcomputer 303, and a gate driver 304. The microcomputer 303 includes abnormal voltage detection means 305, negative pole-side arm short-circuiting means 306, and field current control means 307. The control device 210 and the microcomputer 303 have various functions of the vehicle power converter other than those illustrated in FIG. 3, but FIG. 3 illustrates only the parts relating to the present invention.

The B-terminal voltage detection means 301 detects a voltage VB (B-terminal voltage) at a positive pole-side terminal B corresponding to an input/output terminal for power of the generator-motor apparatus 102 using a potential at the negative pole-side terminal GND of the power conversion section 220 as a reference potential. After converting the detected voltage VB into an AD input range of the microcomputer 303, the B-terminal voltage detection means 301 inputs the AD input obtained by the conversion to the microcomputer 303. The field current detection means 302 detects a current flowing through the field winding 202 by the current sensor 203. After converting the detected current into the AD input range of the microcomputer 303, the field current detection means 302 inputs the AD input obtained by the conversion to the microcomputer 303. The gate driver 304 operates gates of the switching elements 223a to 223c and 224a to 224c of the power conversion section 220 based on a gate signal determined by the microcomputer 303 to cause the switching elements 223a to 223c and 224a to 224c to perform switching.

Next, an operation of short-circuiting the negative pole-side arm is described. The abnormal voltage detection means 305 of the microcomputer 303 detects an overvoltage at the B-terminal based on an output Vbsig of the B-terminal voltage detection means 301. The overvoltage at the B-terminal is determined based on the following abnormal voltage detection threshold value. In the case of a 14 V-system, about 18 V is used as the abnormal voltage detection threshold value. In the case of a 28 V-system, about 36 V is used as the abnormal voltage detection threshold value. When the detected voltage value is equal to or higher than the abnormal voltage detection threshold value determined as described above, the B-terminal voltage is detected as the overvoltage.

Figure 4:
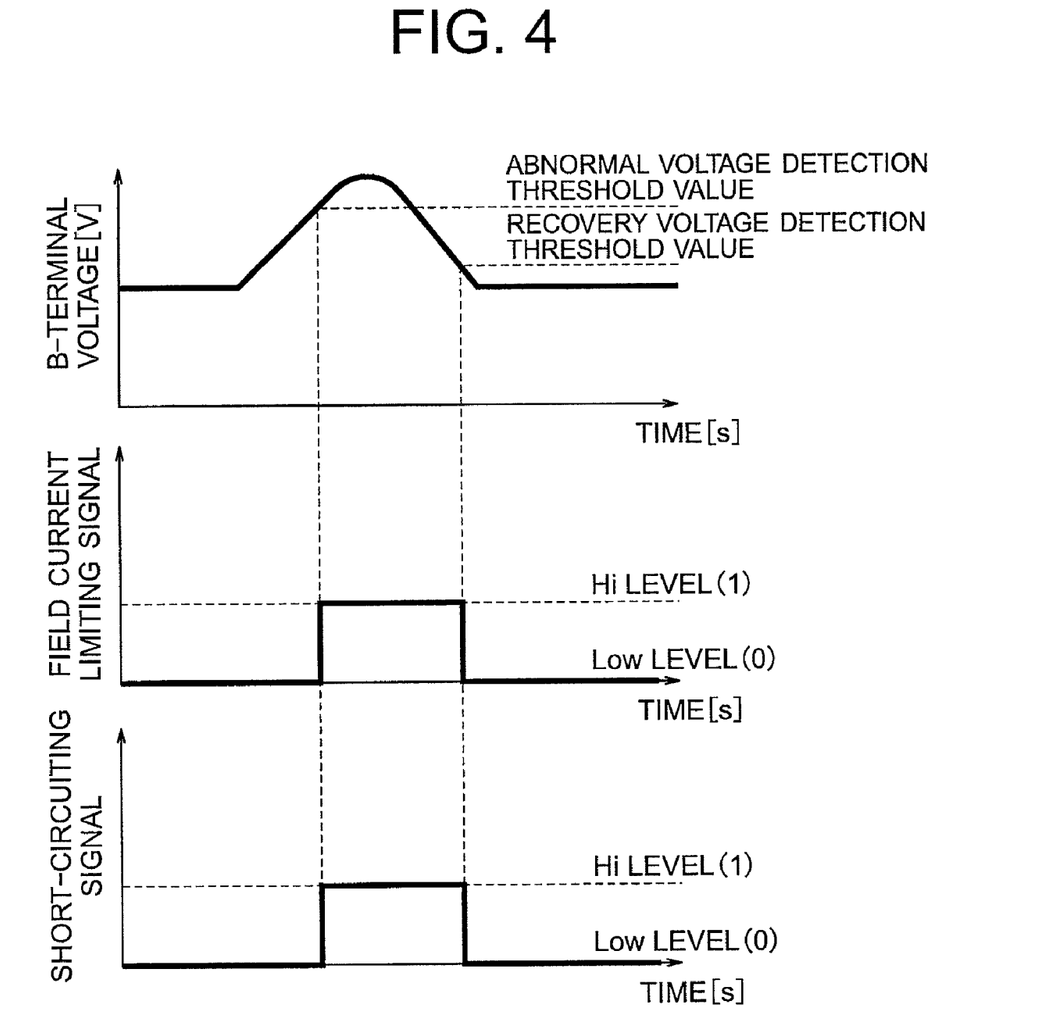
FIG. 4 is a graph illustrating an operation of abnormal voltage detection means included in the control device for the vehicle power converter according to the first embodiment of the present invention.

FIG. 4 is a graph illustrating an operation of the abnormal voltage detection means 305. When the abnormal voltage detection means 305 detects that the B-terminal voltage is equal to or higher than the abnormal voltage detection threshold value, the abnormal voltage detection means 305 sets each of a short-circuiting signal and a field current limiting signal to a Hi level. Then, the abnormal voltage detection means 305 inputs the short-circuiting signal at the Hi level to the negative pole-side arm short-circuiting means 306 and the field current limiting signal at the Hi level to the field current control means 307. Moreover, when detecting that the B-terminal voltage is equal to or lower than a preset recovery voltage detection threshold value, the abnormal voltage detection means 305 sets each of the short-circuiting signal and the field current limiting signal to a Low level. Then, the abnormal voltage detection means 305 inputs the short-circuiting signal at the Low level to the negative pole-side arm short-circuiting means 306 and the field current limiting signal at the Low level to the field current control means 307.

Based on the short-circuiting signal corresponding to an output of the abnormal voltage detection means 305, the negative pole-side arm short-circuiting means 306 outputs a signal for placing all the switching elements 223a to 223c of the positive pole-side arm in an open state and all the switching elements 224a to 224c of the negative pole-side arm in a conductive state (short-circuited state) to the gate driver 304 when the short-circuiting signal is at the Hi level (indicating that the B-terminal voltage is abnormal). On the other hand, when the short-circuiting signal is at the Low level, the negative pole-side arm short-circuiting means 306 does not place the switching elements 224a to 224c of the negative-pole side arm in the conductive state (short-circuited state).

Moreover, based on the field current limiting signal corresponding to an output of the abnormal voltage detection means 305, the field current control means 307 limits the output of the field current control means 307 so as not to allow the field current to flow or so as to allow the field current to flow at a limited value when the field current limiting signal is at the Hi level (indicating that the B-terminal voltage is abnormal). On the other hand, when the field current limiting signal is at the Low level, the field current control means 307 does not limit the output of the field current control means 307.

Figure 5:
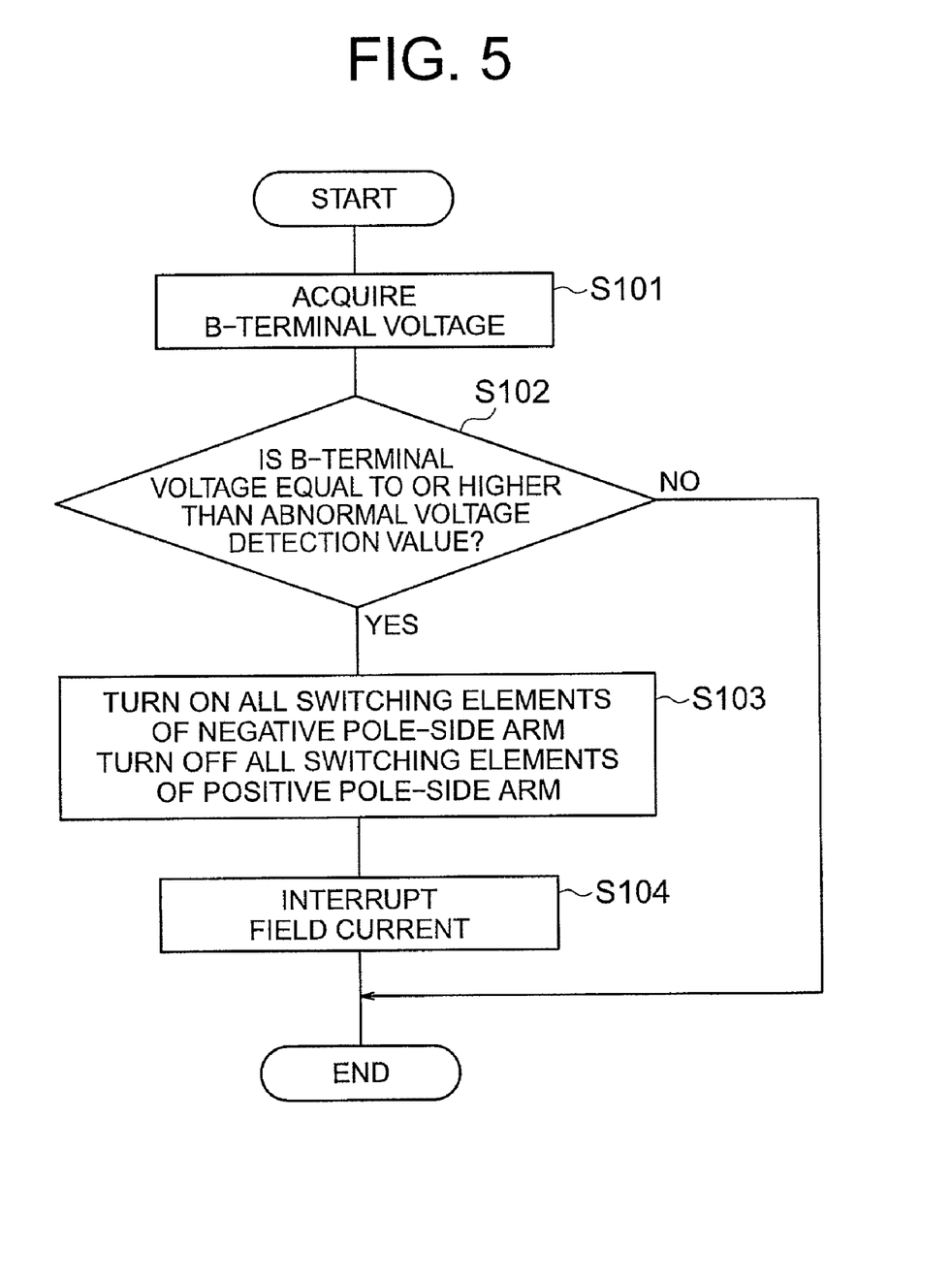
FIG. 5 is a flowchart illustrating an operation of short-circuiting a negative pole-side arm, which is performed by the control device for the vehicle power converter according to the first embodiment of the present invention.

FIG. 5 is a flowchart illustrating an operation of short-circuiting the negative pole-side arm by the control device 210, which is described above referring to FIG. 3. In Step S101, the B-terminal voltage of the generator-motor apparatus 102 is acquired by the B-terminal voltage detection means 301 to be stored in the microcomputer 303. In Step S102, the abnormal voltage detection means 305 of the microcomputer 303 judges whether or not the acquired B-terminal voltage is an abnormal voltage (overvoltage) by the comparison with the threshold value. When it is judged in Step S102 that the B-terminal voltage is the abnormal voltage, the abnormal voltage detection means 305 outputs the short-circuiting signal which is set to the Hi level and the field current limiting signal which is set to the Hi level. Then, the process proceeds to Step S103. On the other hand, when it is judged in Step S102 that the B-terminal voltage is not the abnormal voltage, the abnormal voltage detection means 305 terminates the processing (END) without changing the levels of the short-circuiting signal and the field current limiting signal (while maintaining both the signals at the Low level). In Step S103, the signal for placing all the switching elements 223a to 223c of the positive pole-side arm of the power conversion section 220 in the open state and all the switching elements 224a to 224c of the negative pole-side arm in the conductive state is transmitted by the negative pole-side arm short-circuiting means 306 to the gate driver 304 so as to short-circuit the negative pole-side arm. Next, in Step S104, by the field current control means 307, the output is limited to zero so as not to allow the field current to flow. Alternatively, the field current is limited to such a value that does not allow the power generation. The value of the field current, which does not allow the power generation, is set in advance.

In this first embodiment, the overvoltage at the B-terminal is detected by the microcomputer 303 to be suppressed. Alternatively, the overvoltage may also be detected by a hardware circuit to limit the field current and to short-circuit the negative pole-side arm. This is also applied to the other embodiments described below.

As described above, according to the first embodiment, upon detection of the overvoltage at the B-terminal, the negative pole-side arm of the power converter 102 is placed in the conductive state to be short-circuited while the field current is limited. Therefore, the overvoltage may be suppressed, and hence electric power may be stably supplied even after the cancellation of the short-circuit.

Second Embodiment

Figure 6:
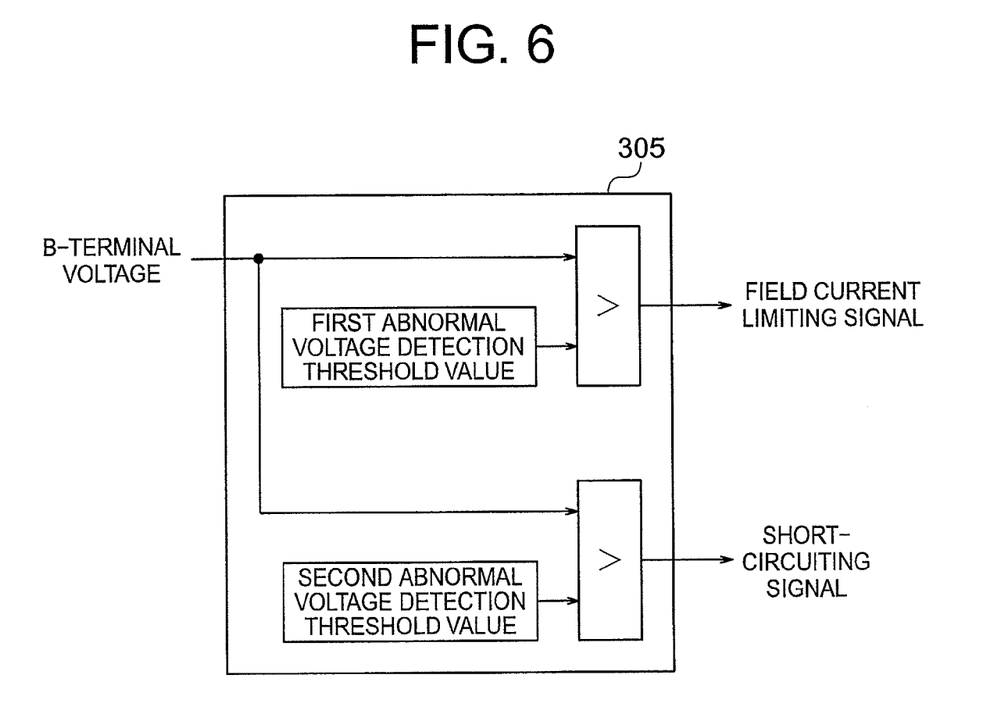
FIG. 6 is a view illustrating a configuration of abnormal voltage detection means included in a control device for a vehicle power converter according to a second embodiment of the present invention.

Hereinafter, the control device for the vehicle power converter according to a second embodiment of the present invention is described in detail. In the second embodiment, differences from the first embodiment are mainly described. FIG. 6 is a view illustrating the abnormal voltage detection means 305 which realizes the second embodiment. The remaining structure is the same as that of the first embodiment.

FIG. 6 illustrates the abnormal voltage detection means 305 according to the second embodiment. In the first embodiment, when the B-terminal voltage becomes equal to or higher than the abnormal voltage detection threshold value, the negative pole-side arm is short-circuited while the field current is limited. In this second embodiment, the short-circuit of the negative pole-side arm and the limitation of the field current are performed individually. The abnormal voltage detection means 305 receives the B-terminal voltage as an input so as to compare the B-terminal voltage and a first abnormal voltage detection threshold value with each other. Then, based on the result of comparison, the abnormal voltage detection means 305 changes the output of the field current limiting signal. Moreover, the abnormal voltage detection means 305 also compares the B-terminal voltage and a second abnormal voltage detection threshold value with each other. Based on the result of comparison, the abnormal voltage detection means 305 changes the output of the short-circuiting signal. By setting the first abnormal voltage detection threshold value lower than the second abnormal voltage detection threshold value, the limitation of the field current and the short-circuit of the negative pole-side arm are performed in a step-by-step manner.

Figure 7:
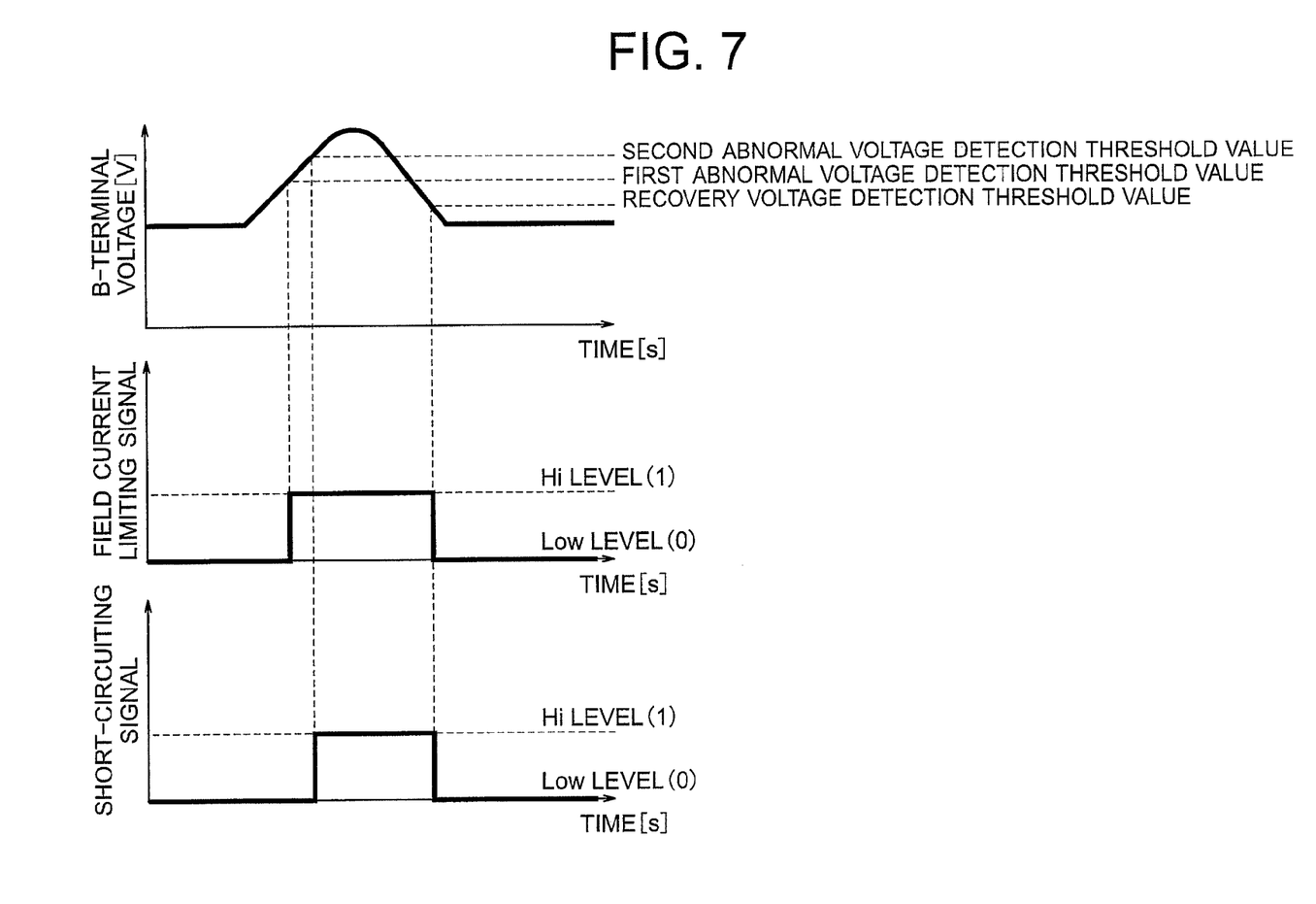
FIG. 7 is a graph illustrating an operation of the abnormal voltage detection means included in the control device for the vehicle power converter according to the second embodiment of the present invention.

FIG. 7 is a graph illustrating the operation of the abnormal voltage detection means 305 according to the second embodiment. When it is detected by the abnormal voltage detection means 305 that the B-terminal voltage is equal to or higher than the first abnormal voltage detection threshold value, the abnormal voltage detection means 305 sets the field current limiting signal to the Hi level, and then, inputs the field current limiting signal at the Hi level to the field current control means 307. After that, when it is detected by the abnormal voltage detection means 305 that the B-terminal voltage is equal to or higher than the second abnormal voltage detection threshold value, the abnormal voltage detection means 305 sets the short-circuiting signal to the Hi level, and then, inputs the short-circuiting signal at the Hi level to the negative pole-side arm short-circuiting means 306.

Based on the field current limiting signal corresponding to an output of the abnormal voltage detection means 305, the field current control means 307 limits the output of the field current control means 307 so as not to allow the field current to flow when the field current limiting signal is at the Hi level. On the other hand, when the field current limiting signal is at the Low level, the field current control means 307 does not limit the output of the field current control means 307.

Based on the short-circuiting signal corresponding to an output of the abnormal voltage detection means 305, the negative pole-side arm short-circuiting means 306 outputs a signal for placing all the switching elements 223a to 223c of the positive pole-side arm in the open state and all the switching elements 224a to 224c of the negative pole-side arm in the conductive state to the gate driver 304 when the short-circuiting signal is at the Hi level. On the other hand, when the short-circuiting signal is at the Low level, the negative pole-side arm short-circuiting means 306 does not place the switching elements 224a to 224c of the negative-pole side arm in the conductive state (short-circuited state).

Figure 8:
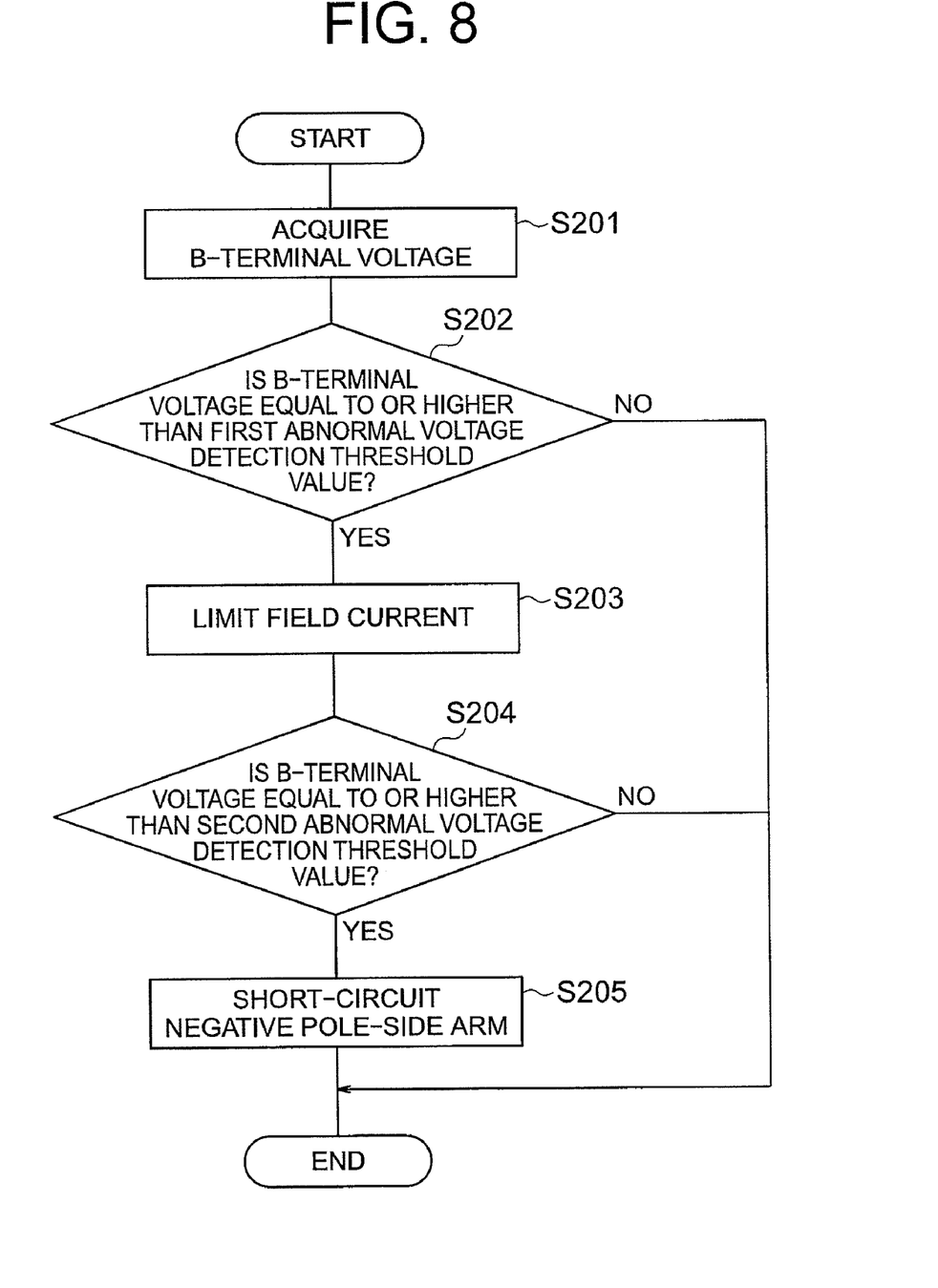
FIG. 8 is a flowchart illustrating an operation of the control device for the vehicle power converter according to the second embodiment of the present invention.

FIG. 8 is a flowchart illustrating an operation of the control device for the vehicle power converter according to the second embodiment. In Step S201, the B-terminal voltage of the generator-motor apparatus 102 is acquired by the B-terminal voltage detection means 301 to be stored in the microcomputer 303. In Step S202, whether or not the B-terminal voltage acquired in Step S201 is equal to or higher than the first abnormal voltage detection threshold value is judged by the abnormal voltage detection means 305. When the B-terminal voltage is equal to or higher than the first abnormal voltage detection threshold value, the abnormal voltage detection means 305 sets the field current limiting signal to the Hi level. Then, the processing proceeds to Step S203. On the other hand, when it is judged in Step S202 that the B-terminal voltage is lower than the first abnormal voltage detection threshold value, the processing proceeds to END. In Step S203, the field current limiting signal at the Hi level is input from the abnormal voltage detection means 305 to the field current control means 307. In this manner, the field current control means 307 limits the output so as not to allow the field current to flow.

In Step S204, whether or not the B-terminal voltage acquired in Step S201 is equal to or higher than the second abnormal voltage detection threshold value is judged by the abnormal voltage detection means 305. When the B-terminal voltage is equal to or higher than the second abnormal voltage detection threshold value, the abnormal voltage detection means 305 sets the short-circuiting signal to the Hi level. Then, the processing proceeds to Step S205. On the other hand, when it is judged in Step S204 that the B-terminal voltage is lower than the second abnormal voltage detection threshold value, the processing proceeds to END. In Step S205, the short-circuiting signal at the Hi level is input from the abnormal voltage detection means 305 to the negative pole-side arm short-circuiting means 306. The negative pole-side arm short-circuiting means 306 transmits the signal for placing all the switching elements 223a to 223c of the positive pole-side arm of the power conversion section 220 in the open state and all the switching elements 224a to 224c of the negative pole-side arm in the conductive state to the gate driver 304. In this manner, the gate driver 304 short-circuits the negative pole-side arm.

As described above, according to the second embodiment, the same effects as those of the first embodiment may be obtained. In addition, when the B-terminal voltage is equal to or higher than the first abnormal voltage detection threshold value, the field current of the power conversion device 102 is limited to suppress the overvoltage. Moreover, when the B-terminal voltage is equal to or higher than the second abnormal voltage detection threshold value, the negative pole-side arm of the power conversion device 102 is short-circuited to suppress the overvoltage. By the processing performed in a step-by-step manner as described above, if the overvoltage may be suppressed by limiting the field current, a fluctuation in torque, which is caused by short-circuiting the negative pole-side arm, may be suppressed. If the overvoltage may not be suppressed only by limiting the field current, the overvoltage may be suppressed by short-circuiting the negative pole-side arm. As a result, the electric power may be stably supplied.

Third Embodiment

Hereinafter, the control device for the vehicle power converter according to a third embodiment of the present invention is described in detail. In the third embodiment, differences from the first and second embodiments are mainly described.

In the third embodiment, for suppressing the overvoltage at the B-terminal, it is sufficient to use any one of the technologies described in the first and second embodiments for the limitation of the field current and the operation of short-circuiting the negative pole-side arm. Therefore, the description thereof is omitted. Here, operations of canceling the short-circuit of the negative pole-side arm and canceling the limitation of the field current are described.

Figure 9:
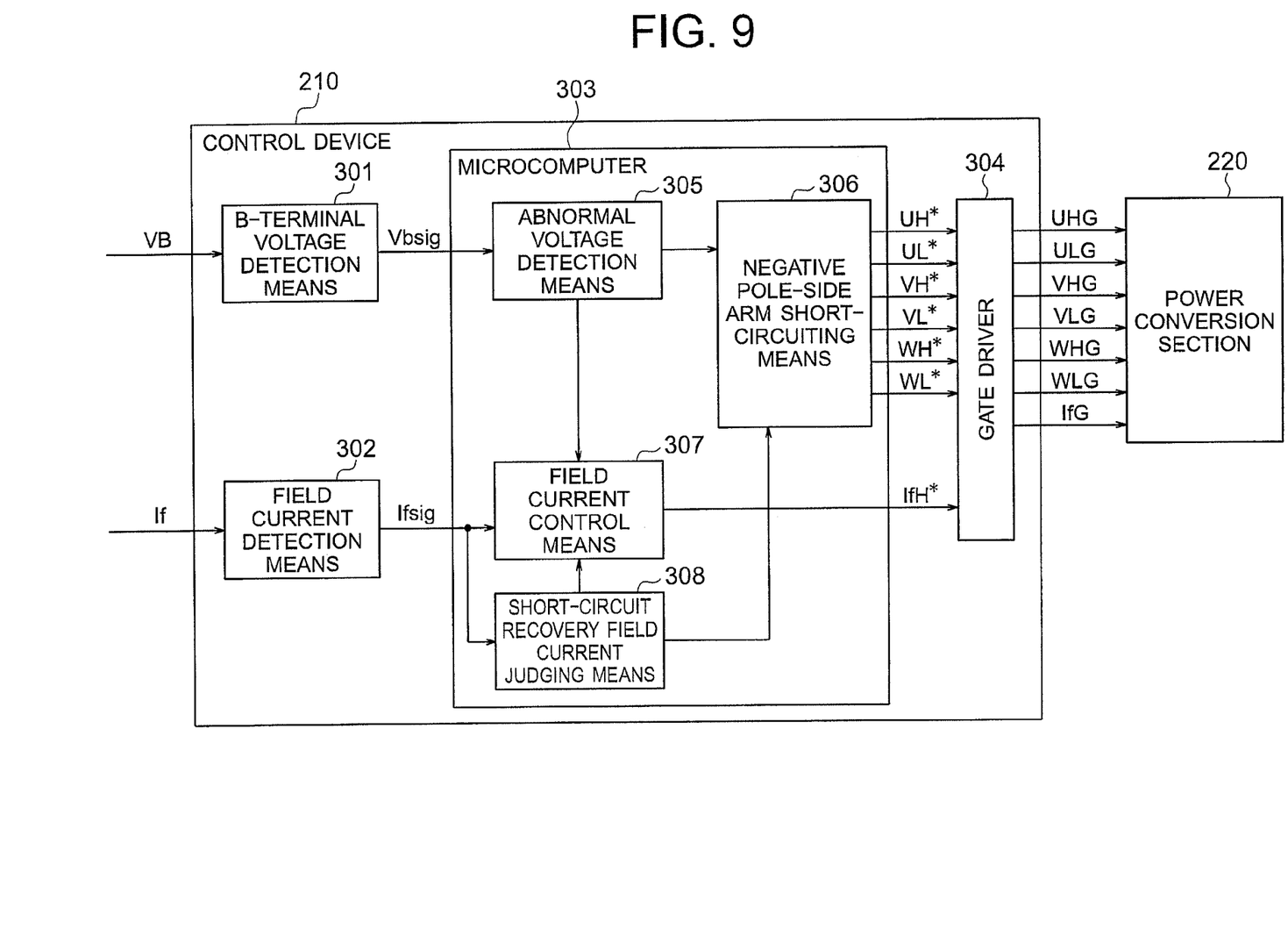
FIG. 9 is a view illustrating a configuration of a control device for a vehicle power converter according to a third embodiment of the present invention.

FIG. 9 illustrates a configuration of the control device 210 for realizing the third embodiment. The control device 210 includes the B-terminal voltage detection means 301, the field current detection means 302, the microcomputer 303, and the gate driver 304. The microcomputer 303 includes the abnormal voltage detection means 305, the negative pole-side arm short-circuiting means 306, the field current control means 307, and short-circuit recovery field current judging means 308. The control device 210 and the microcomputer 303 have various functions for the vehicle power converter other than those illustrated in FIG. 9, but FIG. 9 illustrates only the parts relating to the present invention. The third embodiment differs from the first and second embodiments in that the short-circuit recovery field current judging means 308 is additionally provided. The remaining structure is the same as that of the first embodiment or that of the second embodiment, and hence the description thereof is omitted.

FIG. 4 and FIG. 7 are graphs illustrating the operation of the abnormal voltage detection means 305 according to the third embodiment. When it is detected by the abnormal voltage detection means 305 that the B-terminal voltage is equal to or higher than the first abnormal voltage detection threshold value (corresponding to the abnormal voltage detection threshold voltage of FIG. 4), the abnormal voltage detection means 305 sets the field current limiting signal to the Hi level, and then, inputs the field current limiting signal at the Hi level to the field current control means 307. When it is detected by the abnormal voltage detection means 305 that the B-terminal voltage is equal to or higher than the second abnormal voltage detection threshold value (corresponding to the abnormal voltage detection threshold voltage of FIG. 4), the abnormal voltage detection means 305 sets the short-circuiting signal to the Hi level, and then, inputs the short-circuiting signal at the Hi level to the negative pole-side arm short-circuiting means 306.

Based on the output from the B-terminal voltage detection means 301, the abnormal voltage detection means 305 judges whether or not the B-terminal voltage has become equal to or lower than a recovery voltage detection threshold value. As the recovery voltage detection threshold value, about 14 V is suitably-set in the case of the 14 V-system, whereas about 28 V is suitably set in the case of the 28 V-system. When the B-terminal voltage becomes equal to or lower than the recovery voltage detection threshold value, the short-circuiting signal and the field current limiting signal are both set to the Low level to be respectively input to the negative pole-side arm short-circuiting means 306 and the field current control means 307.

The short-circuit recovery field current judging means 308 receives the output of the field current detection means 302 as an input to judge whether or not the field current has a predetermined value or lower. The predetermined value may be set to 0 A or may be a field current value which is determined in advance by an experiment using a rotating speed and the B-terminal voltage as parameters. The predetermined value may be any value of the field current as long as the value is set so that an induced voltage does not exceed the B-terminal voltage. When the field current is a current having the predetermined value or less, the short-circuit recovery field current judging means 308 changes a level of a short-circuit canceling signal corresponding to an output of the short-circuit recovery field current judging means 308 to the Hi level, and then, inputs the short-circuit canceling signal at the Hi level to each of the negative pole-side arm short-circuiting means 306 and the field current control means 307.

When the short-circuiting signal corresponding to the output of the abnormal voltage detection means 305 is at the Low level and the short-circuit canceling signal corresponding to the output of the short-circuit recovery field current judging means 308 is at the Hi level, the negative pole-side arm short-circuiting means 306 changes the state of the switching elements 224a to 224c of the negative-pole side arm of the power conversion section 220 from the conductive state into the open state to cancel the short-circuit of the negative pole-side arm.

When the short-circuit canceling signal corresponding to the output of the short-circuit recovery field current judging means 308 is at the Hi level and the field current limiting signal corresponding to the output of the abnormal voltage detection means 305 is at the Low level, the field current control means 307 cancels the limitation of the output of the field current so as to allow the field current to flow through the field winding 202.

Figure 10:
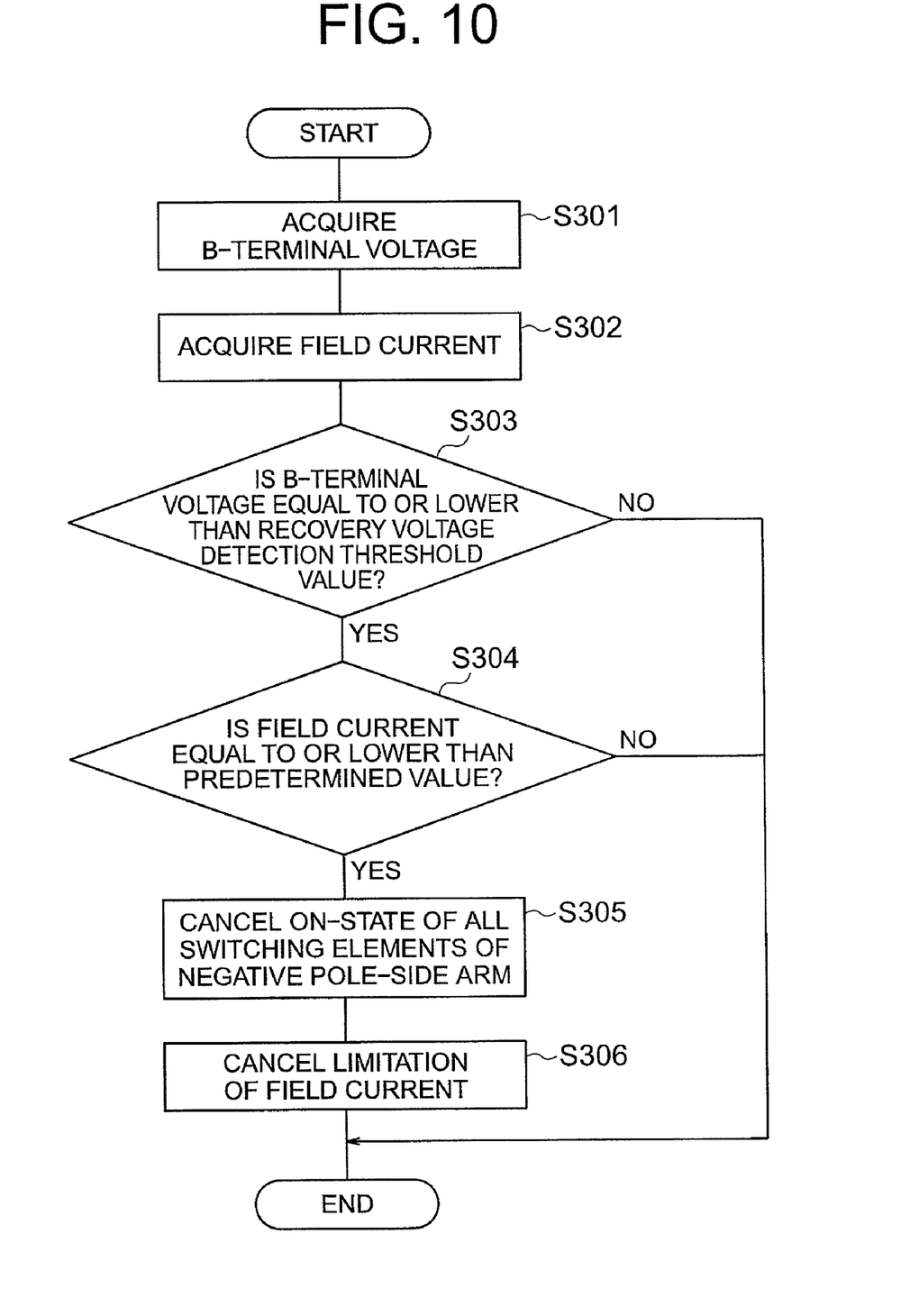
FIG. 10 is a flowchart illustrating an operation of canceling short-circuit of a negative pole-side arm, which is performed by the control device for the vehicle power converter according to the third embodiment of the present invention.

FIG. 10 is a flowchart illustrating the operation of canceling the short-circuit of the negative pole-side arm by the control device 210, which is described above referring to FIG. 9. In Step S301, the B-terminal voltage of the generator-motor apparatus 102 is acquired by the B-terminal voltage detection means 301 to be stored in the microcomputer 303. In Step S302, the field current flowing through the field winding 202 of the generator-motor apparatus 102 is acquired by the field current detection means 302 to be stored in the microcomputer 303. In Step S303, whether or not the B-terminal voltage acquired in Step S301 is equal to or lower than the recovery voltage detection threshold value is judged by the abnormal voltage detection means 305. When the B-terminal voltage is equal to or lower than the recovery voltage detection threshold value, the short-circuiting signal corresponding to the output of the abnormal voltage detection means 305 and the field current limiting signal are both set to the Low level. Then, the processing proceeds to Step S304. On the other hand, when the B-terminal voltage is not equal to or lower than the recovery voltage detection threshold value, the processing proceeds to END. In Step S304, whether or not the field current is equal to or lower than the predetermined current value is judged by the short-circuit recovery field current judging means 308. When the field current is equal to or lower than the predetermined current value, the short-circuit canceling signal corresponding to the output of the short-circuit recovery field current judging means 308 is set to the Hi level. Then, the processing proceeds to Step S305. On the other hand, when it is judged in Step S304 that the field current is not the current having the predetermined current value or lower, the processing proceeds to END. In Step S305, the states of the switching elements 224a to 224c of the power conversion section 220 are changed from the conductive state into the open state by the negative pole-side arm short-circuiting means 306 to cancel the short-circuit of the negative pole-side arm. Next, in Step S306, when the short-circuit canceling signal at the Hi level, which corresponds to the output of the short-circuit recovery field current judging means 308, and the field current limiting signal at the Low level are input to the field current control means 307, the limitation of the field current is cancelled so as to allow the field current to flow through the field winding 202.

As described above, in the third embodiment, the same effects as those of the first embodiment or the second embodiment may be obtained. In addition, for canceling the short-circuit of the negative pole-side arm, the condition in which the B-terminal voltage and the field current are both equal to or lower than the respective predetermined values is set. As a result, even if the disconnection of the B-terminal is occurring at the time of cancellation of the short-circuit of the negative pole-side arm, the overvoltage at the B-terminal is not repeatedly caused. Therefore, the electric power may be stably supplied.

What is claimed is:

1. A control device for a power converter, which is connected to a polyphase AC generator-motor including an armature winding and a field winding,
    the power converter comprising:
        a bridge rectifier circuit including switching elements of a positive pole-side arm and switching elements of a negative pole-side arm, for controlling energization of the armature winding; and
        a field circuit for controlling energization of the field winding by using a field switching element,
    wherein the control device controls switching of the switching elements of the bridge rectifier circuit and the field switching element of the field circuit,
    wherein the control device comprises:
        B-terminal voltage detection means for detecting a B-terminal voltage generated between a B-terminal being to a power input/output terminal of the polyphase AC generator-motor and a reference potential;
        field current detection means for detecting a field current flowing through the field winding;
        field current control means for controlling the field current based on a detected value of the field current;
        abnormal voltage detection means for detecting whether or not a voltage value of the B-terminal voltage is equal to or higher than a predetermined voltage value; and
        negative pole-side arm short-circuiting means for bringing all the switching elements of the negative pole-side arm into conduction when the abnormal voltage detection means detects that the voltage value of the B-terminal voltage is equal to or higher than the predetermined voltage value,
    wherein, when the abnormal voltage detection means detects that the voltage value of the B-terminal voltage is equal to or higher than the predetermined voltage value, the control device causes the negative pole-side arm short-circuiting means to bring all the switching elements of the negative pole-side arm into conduction and to interrupt all the switching elements of the positive pole-side arm, and causes the field current control means to limit the field current.

2. A control device for a vehicle power converter according to claim 1, wherein:
    the abnormal voltage detection means has a first predetermined voltage value and a second predetermined voltage value as the predetermined voltage value;
    the first predetermined voltage value is set lower than the second predetermined voltage value; and
    when the abnormal voltage detection means detects that the voltage value of the B-terminal voltage is equal to or higher than the first predetermined voltage value, the control device causes the field current control means to limit the field current, and
    when the abnormal voltage detection means detects that the voltage value of the B-terminal voltage is equal to or higher than the second predetermined voltage value, the control device brings all the switching elements of the negative pole-side arm into conduction and interrupts all the switching elements of the positive pole-side arm.

3. A control device for a vehicle power converter according to claim 1, further comprising short-circuit recovery field current judging means for detecting whether or not a current value of the field current is equal to or lower than a predetermined current value,
    wherein the control device cancels the conduction of all the switching elements of the negative pole-side arm and cancels the limitation of the field current when the abnormal voltage detection means detects that the voltage value of the B-terminal voltage is equal to or lower than the predetermined voltage value and the short-circuit recovery field current judging means detects that the current value of the field current is equal to or lower than the predetermined current value.

* * * * *